US010668771B2

(12) United States Patent
Cherian et al.

(10) Patent No.: US 10,668,771 B2
(45) Date of Patent: Jun. 2, 2020

(54) CASTER

(71) Applicants: Koshy Cherian, Chapel Hill, NC (US); Usha Cherian, Chapel Hill, NC (US)

(72) Inventors: Koshy Cherian, Chapel Hill, NC (US); Usha Cherian, Chapel Hill, NC (US)

( * ) Notice: Subject to any disclaimer, the term of this patent is extended or adjusted under 35 U.S.C. 154(b) by 135 days.

(21) Appl. No.: 15/955,832

(22) Filed: Apr. 18, 2018

(65) Prior Publication Data

US 2018/0319216 A1 Nov. 8, 2018

Related U.S. Application Data

(60) Provisional application No. 62/502,671, filed on May 6, 2017.

(51) Int. Cl.
*B60B 33/08* (2006.01)
*B60B 33/00* (2006.01)
*B60B 19/14* (2006.01)

(52) U.S. Cl.
CPC .......... *B60B 33/08* (2013.01); *B60B 33/0005* (2013.01); *B60B 19/14* (2013.01)

(58) Field of Classification Search
CPC .................................................. B60B 33/08
USPC ............................................................ 16/26
See application file for complete search history.

(56) References Cited

U.S. PATENT DOCUMENTS

| 91,086 | A | * | 6/1869 | Chandler | B60B 33/08 16/25 |
| 94,682 | A | * | 9/1869 | Wilson | B60B 33/08 16/26 |
| 372,387 | A | * | 11/1887 | Rix | B60B 33/08 16/26 |
| 1,033,264 | A | * | 7/1912 | Oppy | B60B 33/08 16/26 |
| 1,082,968 | A | * | 12/1913 | Morgan | B60B 33/08 16/26 |
| 1,270,390 | A | * | 6/1918 | Elwertoski | B60B 33/08 16/26 |
| 1,301,139 | A | * | 4/1919 | Laskowski | B60B 33/08 16/26 |
| 1,454,119 | A | * | 5/1923 | Knaack | B60B 33/08 16/26 |

(Continued)

FOREIGN PATENT DOCUMENTS

| DE | 3619875 A1 | 12/1987 |
| DE | 4102291 A1 | 7/1992 |

(Continued)

OTHER PUBLICATIONS

International Search Report dated Jul. 19, 2018 in re International Application No. PCT/US2018/028062 filed Apr. 18, 2018.

*Primary Examiner* — Jeffrey O'Brien
(74) *Attorney, Agent, or Firm* — Coats & Bennett, PLLC

(57) ABSTRACT

A caster configured to be attached to an object and provide for rolling movement of the object. The caster may include a main wheel and multiple support members that contact against and support the main wheel. One or more support members include a first sphere that may contact against a top of the main wheel. One or more support members include a second sphere that may contact against the main wheel along lateral sides of the main wheel and offset from the top.

13 Claims, 12 Drawing Sheets

(56) References Cited

U.S. PATENT DOCUMENTS

| | | | |
|---|---|---|---|
| 1,460,159 A * | 6/1923 | Karpiej | B60B 33/08 16/26 |
| 1,542,231 A | 6/1925 | Garfield | |
| 1,970,439 A * | 8/1934 | Townsend | F16C 31/04 384/610 |
| 2,767,420 A | 10/1956 | Riccio | |
| 3,381,330 A * | 5/1968 | Aninger | B60B 33/08 16/21 |
| 3,557,401 A * | 1/1971 | Jenkins | B60B 33/08 16/26 |
| 3,559,802 A | 2/1971 | Eidus | |
| 3,739,894 A | 6/1973 | Hinman | |
| 3,744,083 A | 7/1973 | Jenkins | |
| 3,767,420 A | 10/1973 | Kim | |
| 3,797,067 A | 3/1974 | Rodgers | |
| 3,893,700 A | 7/1975 | Dunmyer | |
| 4,203,177 A | 5/1980 | Kegg et al. | |
| 4,285,550 A | 8/1981 | Blackburn et al. | |
| 4,382,637 A | 5/1983 | Blackburn et al. | |
| 4,400,032 A | 8/1983 | dePolo | |
| 4,996,738 A * | 3/1991 | Tifre | B60B 33/08 16/26 |
| 5,136,751 A | 8/1992 | Coyne et al. | |
| 5,172,482 A | 12/1992 | Coleman | |
| 5,219,058 A | 6/1993 | Sunseth | |
| 5,379,485 A | 1/1995 | Oshins et al. | |
| 5,626,353 A | 5/1997 | Cambell | |
| 5,634,240 A | 6/1997 | Brokaw | |
| 6,038,734 A | 3/2000 | Facchin | |
| 6,134,747 A | 10/2000 | Leibman | |
| 6,409,388 B1 * | 6/2002 | Lin | B60B 33/08 16/29 |
| 6,772,478 B2 | 8/2004 | Herder | |
| 8,196,944 B1 * | 6/2012 | Vondrak | A61G 5/02 280/250.1 |
| 8,533,908 B2 * | 9/2013 | Scicluna | A45C 5/14 16/24 |
| 9,796,213 B1 * | 10/2017 | Menard | B60B 33/08 |
| 2006/0220371 A1 * | 10/2006 | Yang | A63C 17/006 280/843 |
| 2009/0293227 A1 * | 12/2009 | Wang | B60B 33/08 16/26 |
| 2010/0038960 A1 | 2/2010 | Takenaka et al. | |
| 2012/0006602 A1 * | 1/2012 | Orenbuch | B60B 33/08 180/6.2 |

FOREIGN PATENT DOCUMENTS

| | | |
|---|---|---|
| JP | 58-141901 A | 8/1983 |
| JP | 06-106907 A | 4/1994 |

* cited by examiner

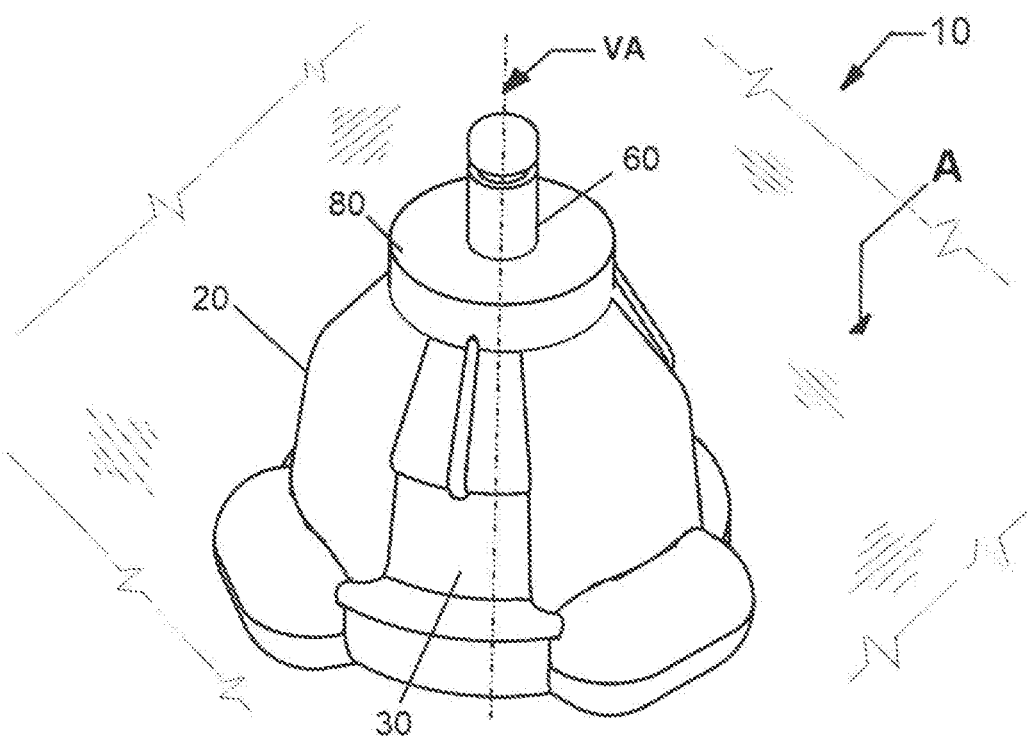
Fig : 1
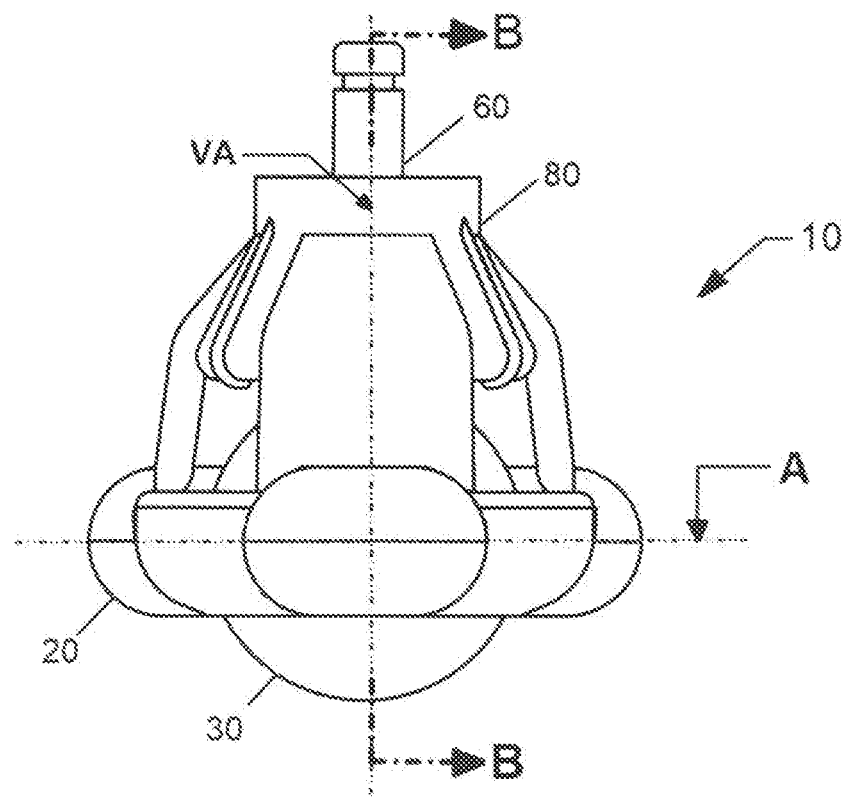
Fig : 2

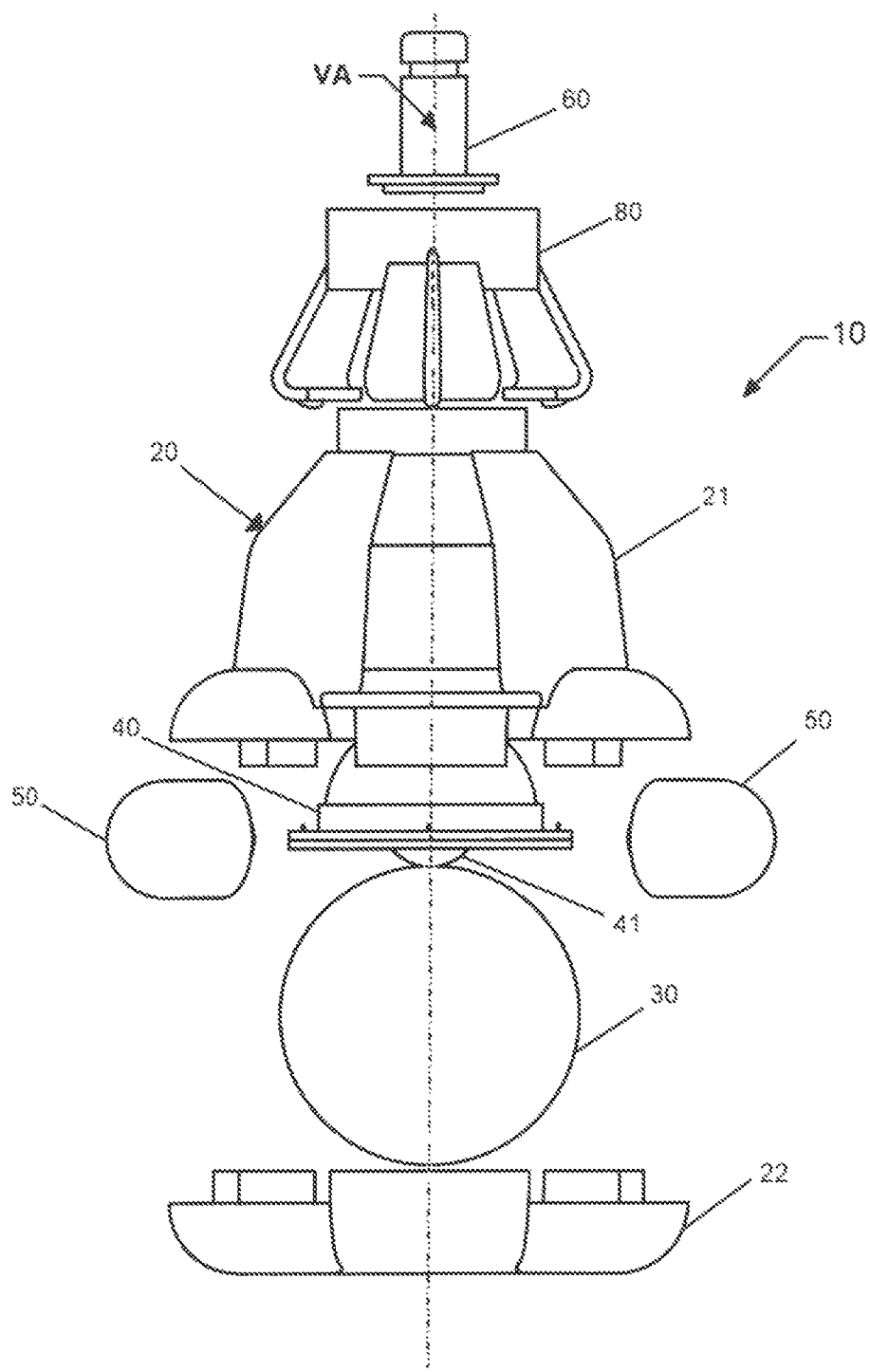

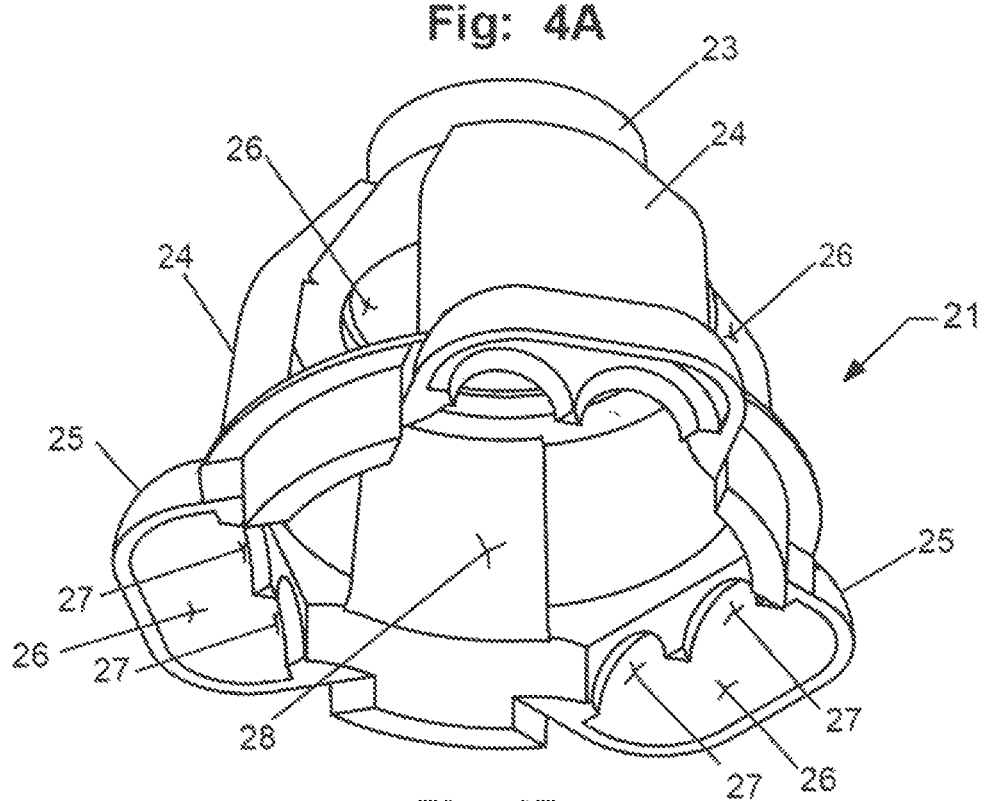
Fig: 4A
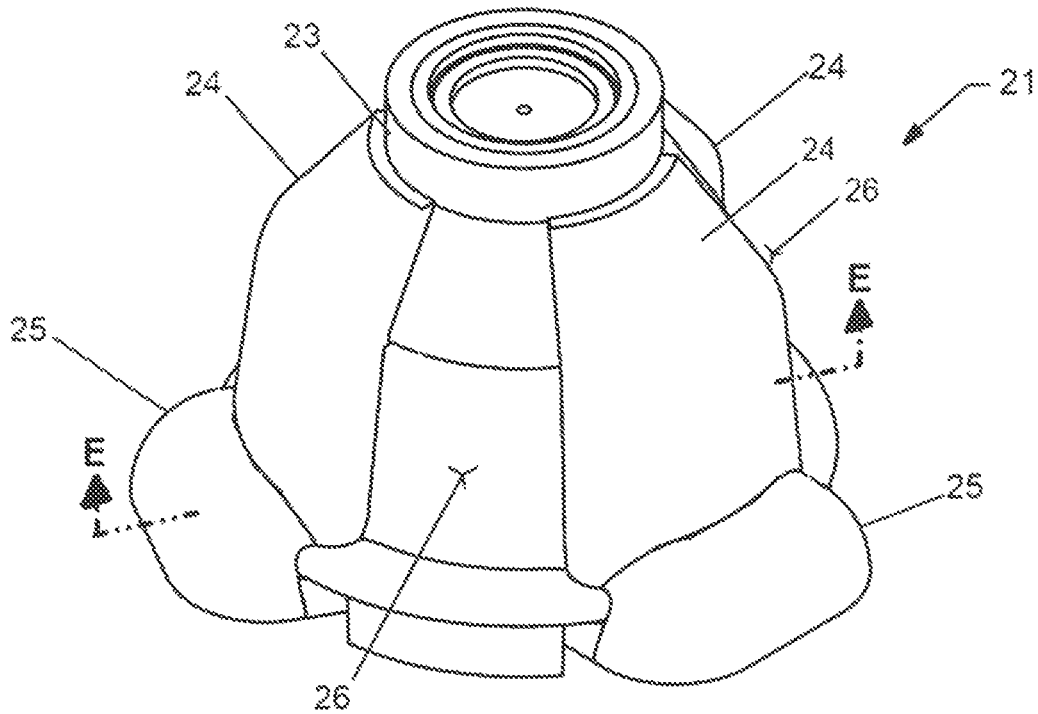
Fig: 4B

Fig : 5A
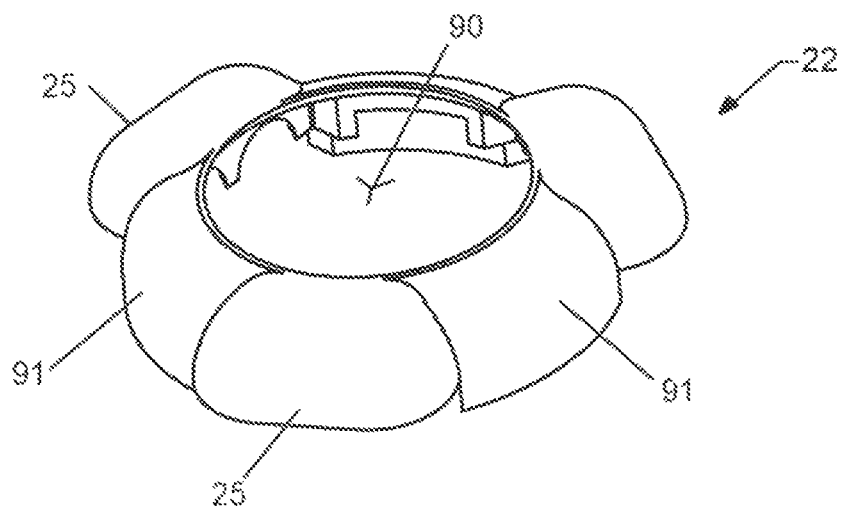
Fig : 5B
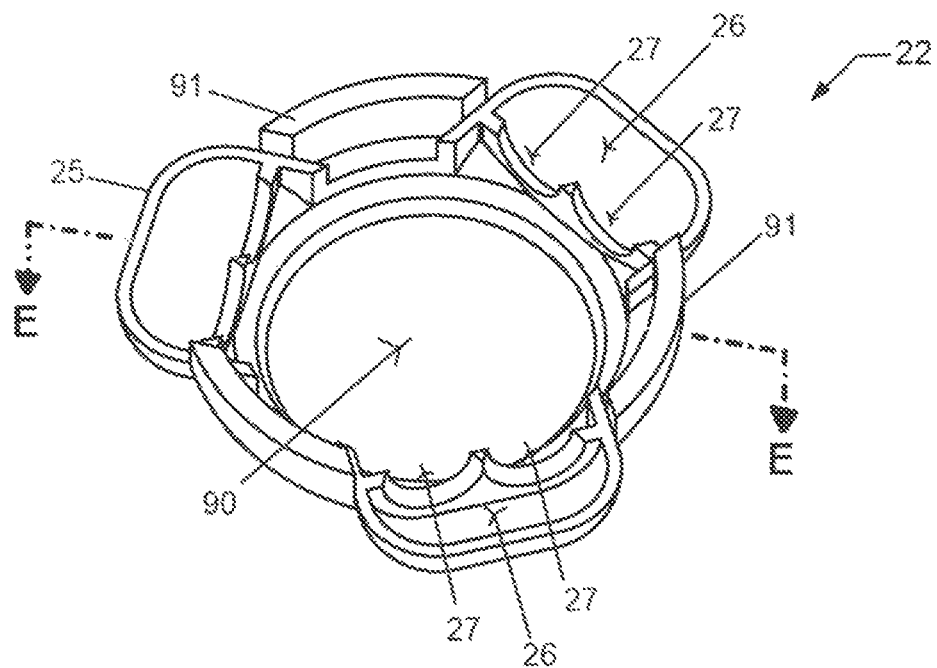

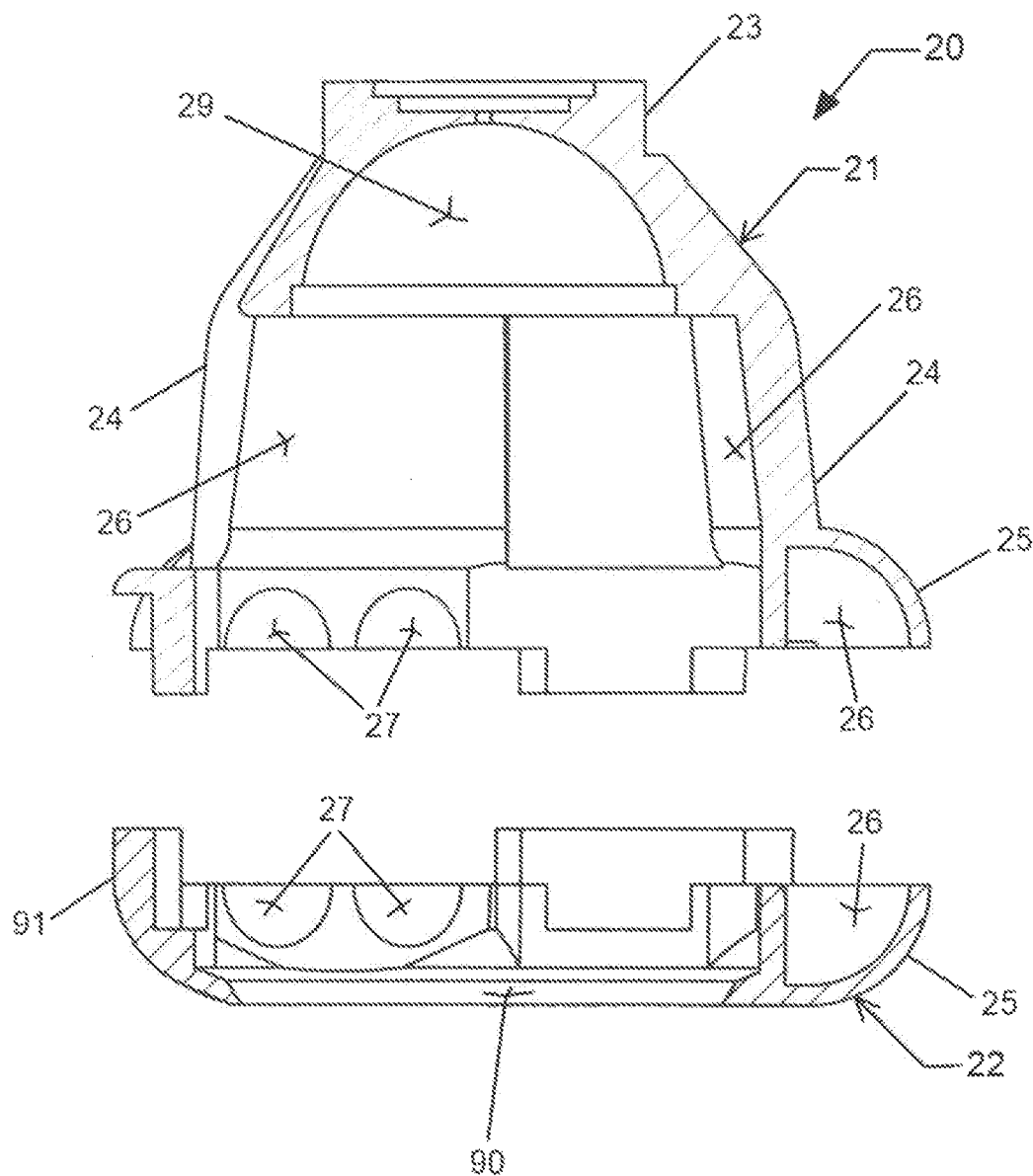

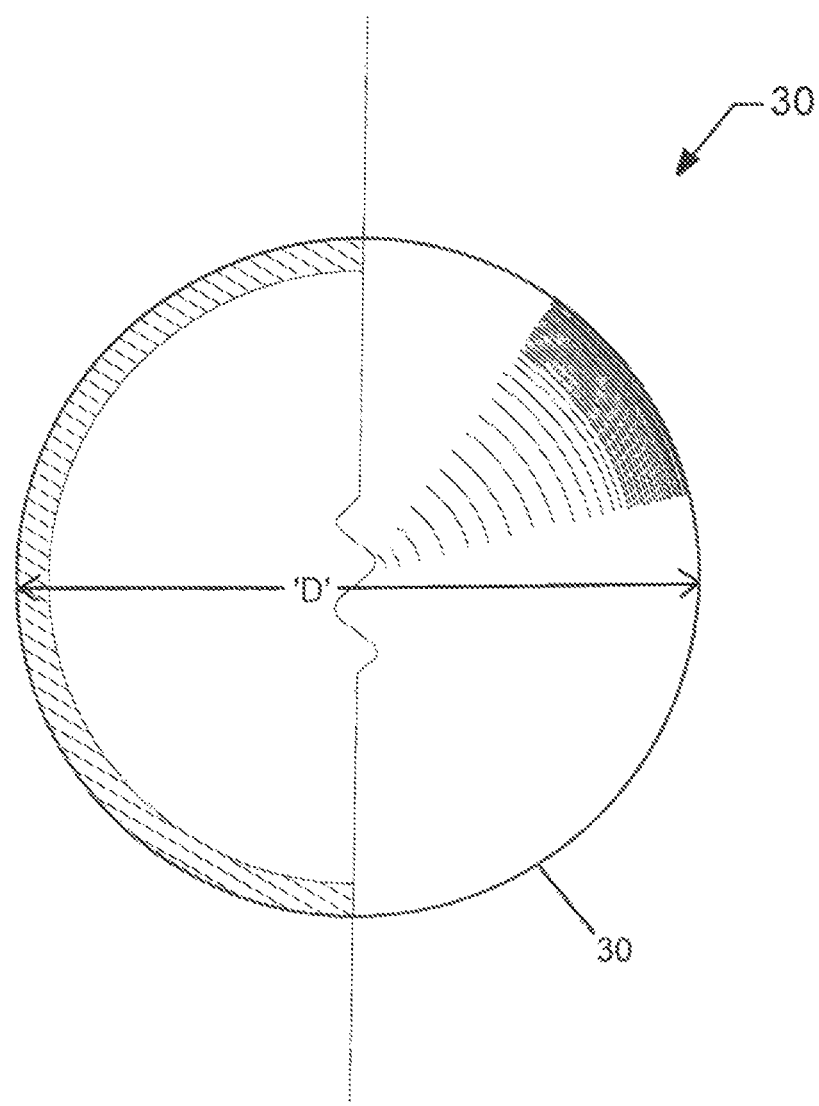

Fig: 8
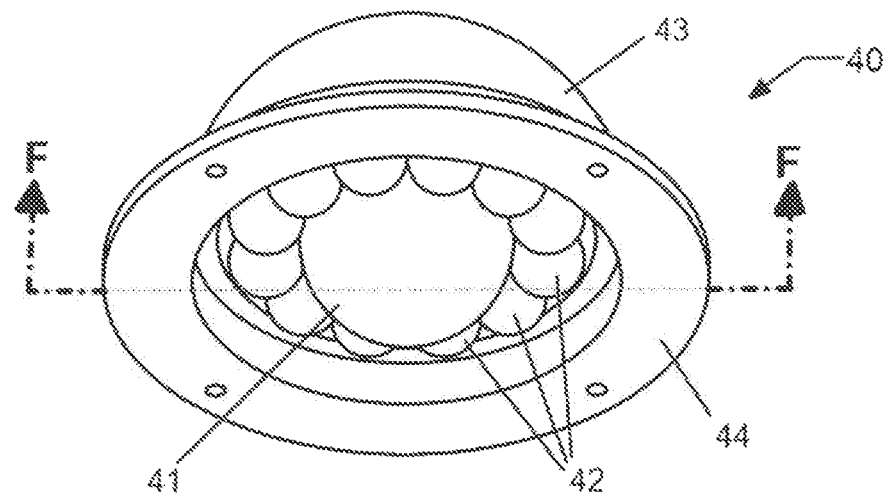
Fig: 9
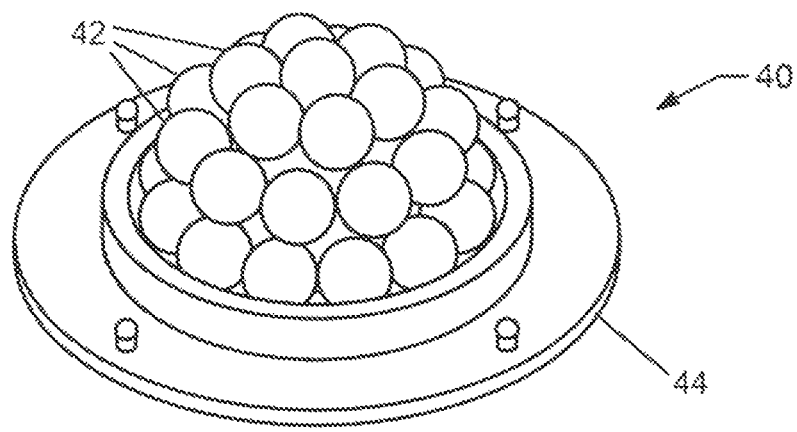
Fig: 10
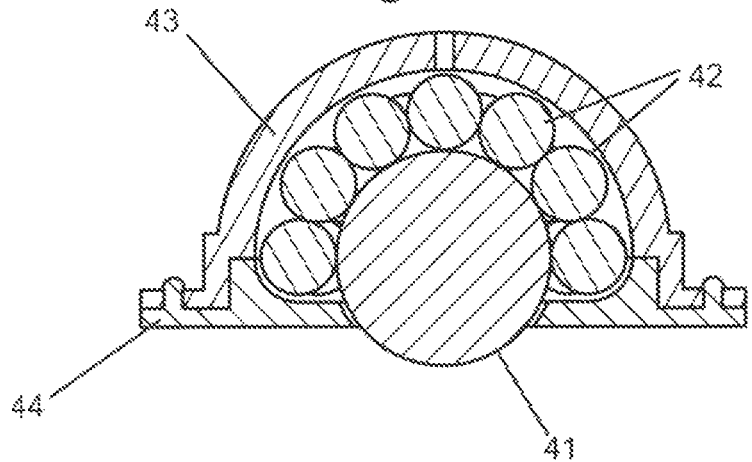

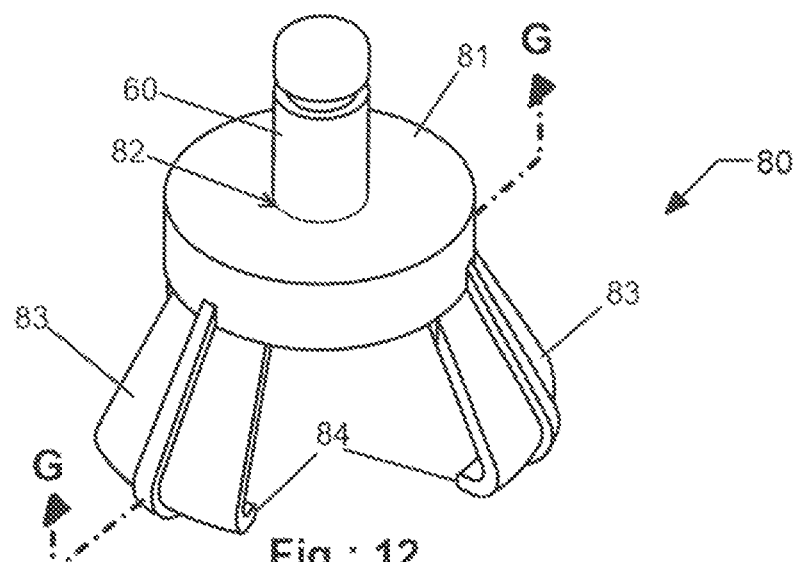
Fig : 11
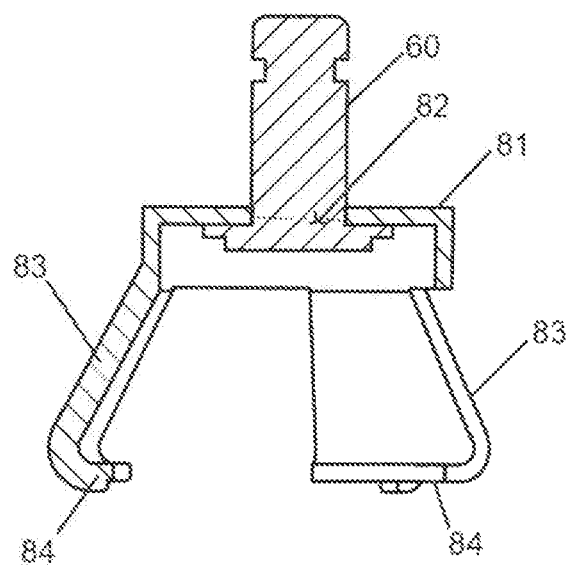
Fig : 12
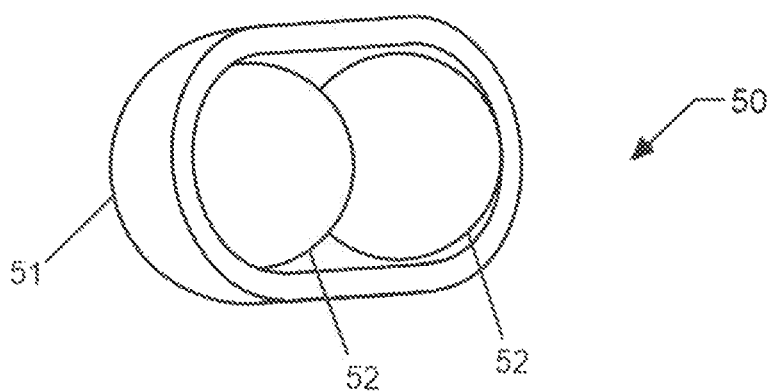
Fig : 13

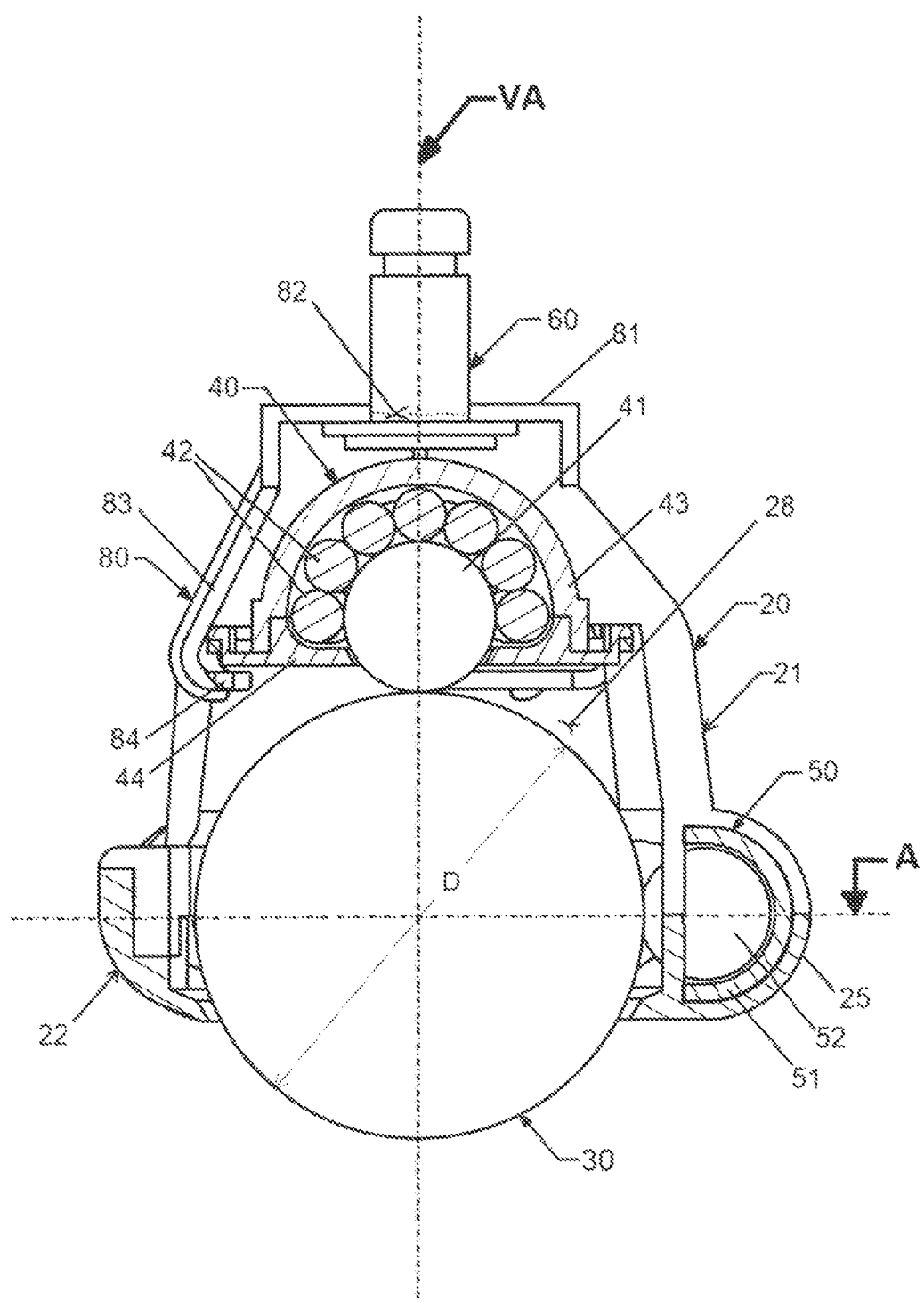

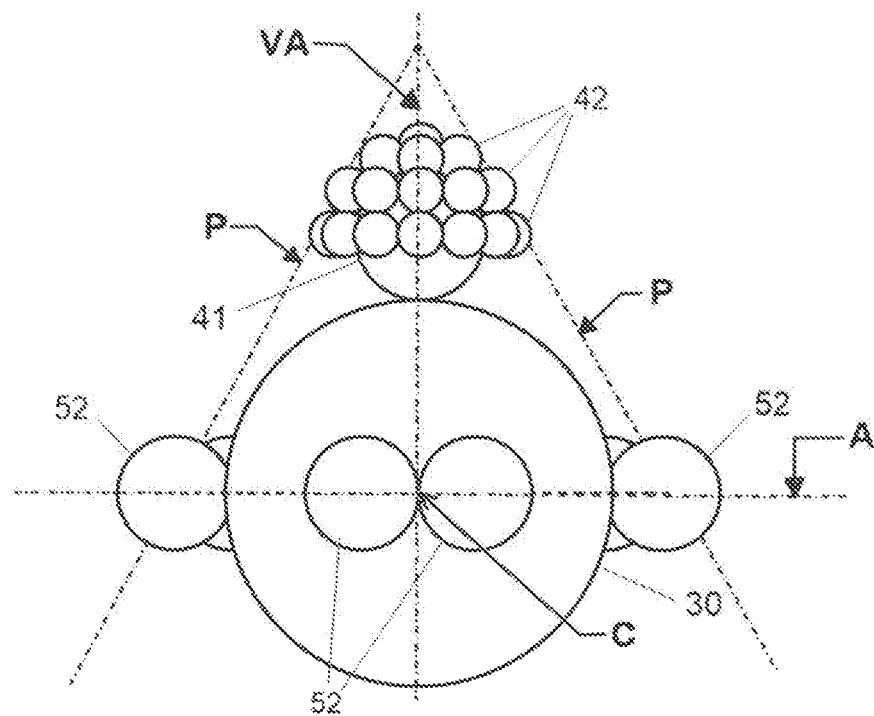
Fig : 15
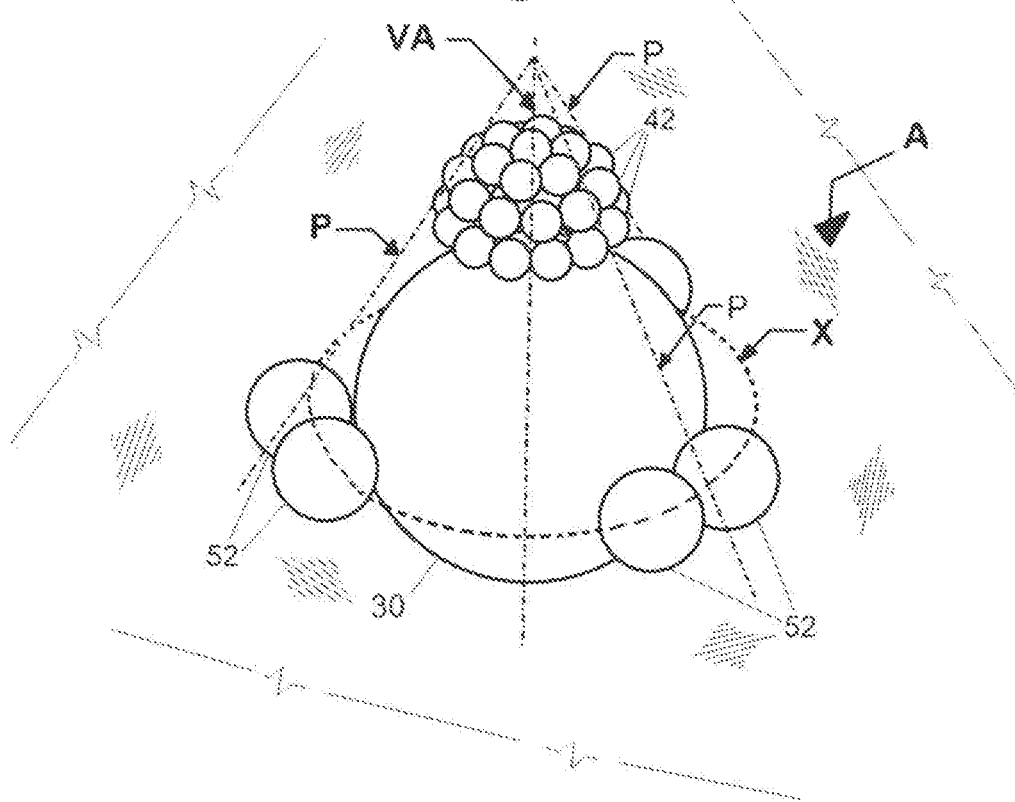
Fig : 16

Fig : 17
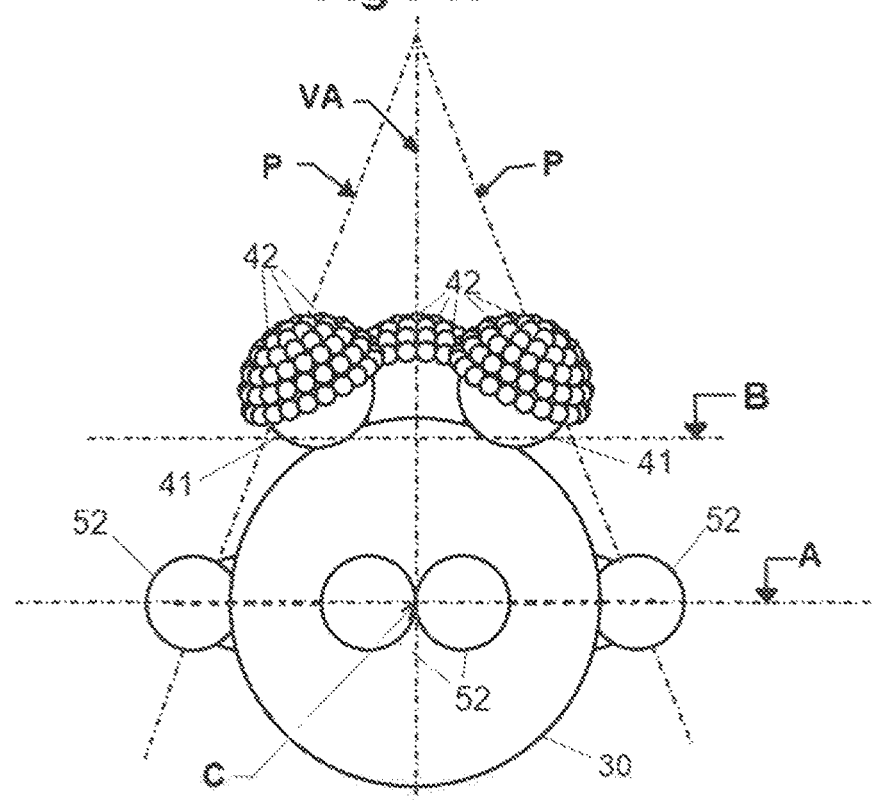
Fig : 18
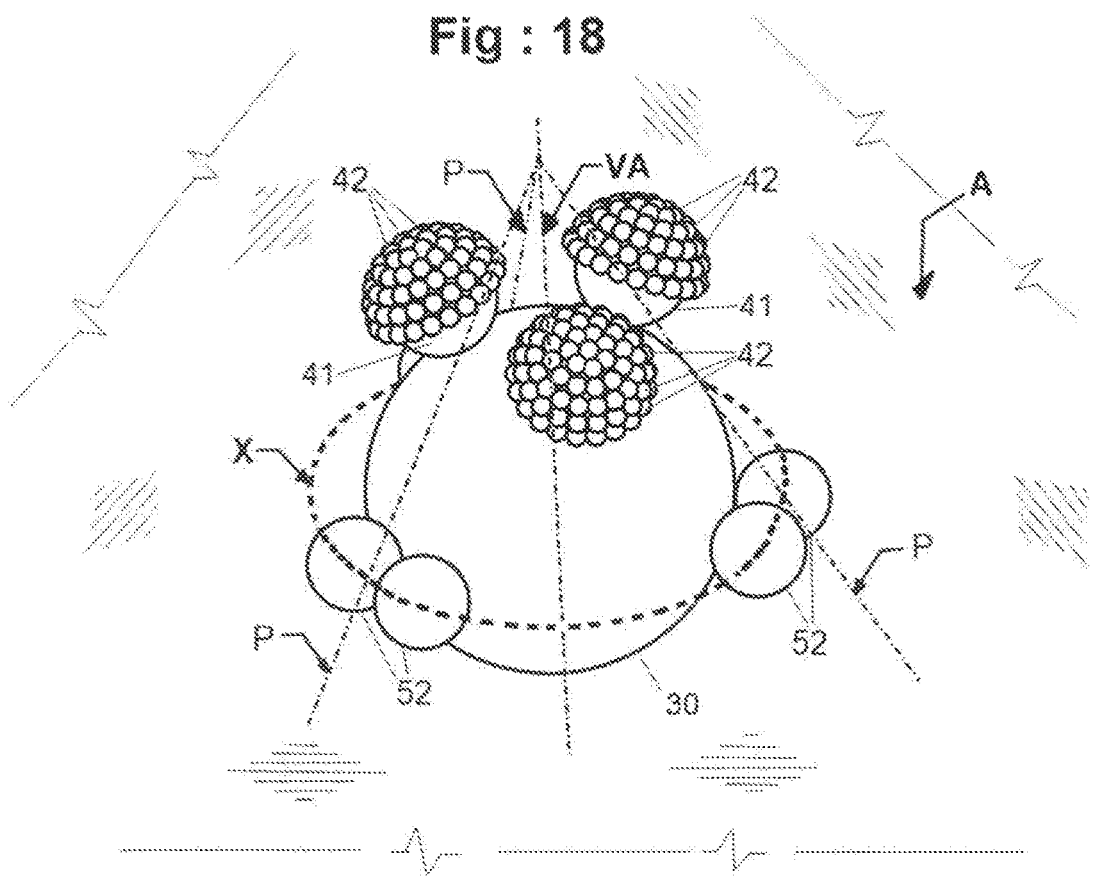

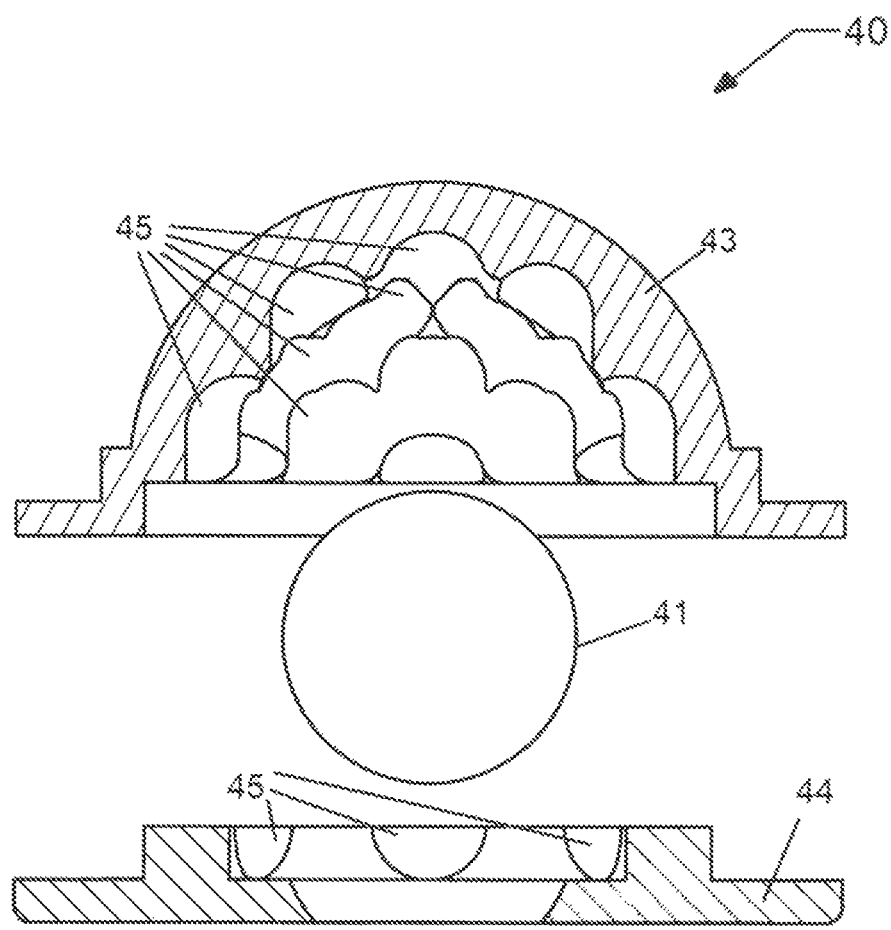
Fig : 19

CASTER

CROSS-REFERENCE TO RELATED APPLICATIONS

The present application claims the benefit of U.S. Application No. 62/502,671 filed on May 6, 2017, the disclosure of which is hereby incorporated by reference in its entirety.

BACKGROUND

A caster is a wheeled device configured to be mounted to a larger object that enables rolling of the larger object. Casters can be used in a variety of different applications, including but not limited to chairs, beds, tables, desks, and appliances.

In a hospital setting, casters are used to ease the transport of many pieces of equipment, ranging from IV poles, to trash and linen carts, to the racks used to distribute patient meals. The extensive use of rolling equipment makes it essential for hospitals to have quiet and cost-effective wheels. Unfortunately, current options are limited on casters that meet the needs of hospitals.

The Hospital Consumer Assessment of Healthcare Providers and Systems (HCAHP) survey is used to assess patient perspectives on their hospital care. For many hospitals, a "quietness" score that represents the percentage of patients indicating that the area around their room is quiet at night is often the lowest scoring dimension of the HCAHP survey. In addition to being a nuisance, HCAHP survey data are publicly reported and low scores may negatively impact reimbursement and consumer hospital selection.

While many factors contribute to the disruptive noise level in hospitals, one significant source is the widespread use of rolling equipment. The casters used on the equipment contribute to the high noise levels. A common problem with casters is the noise caused by friction between the bearings and axles when the caster is carrying a load. Another noise issue is the vibrations of one or more components of the caster that occur during movement.

SUMMARY

It is a general object of the invention to provide a new and improved caster that will not only be significantly quieter than the average caster that is available on the market but to also be much cheaper to produce. This was achieved by introducing the first caster to employ multiple level bearing systems within one unit, doing away with the necessity for axles. Meaning that a high level of the precision that is needed in most casters for things such as controlling the camber angle or maintaining alignment were not needed in the assembly of this caster. This facilitates hand assembly of the caster once the individual components have been manufactured, leading to a drastic reduction of the price of the unit, compared to competitors in the market. The primary and secondary bearing systems promote this self-alignment while decreasing the shearing force and inertia. Meaning that the load can be centered on the caster unit creating greater stability for the appliances, meaning devices such as IV poles will generate less sound when being wheeled around. This combined with the usage of low friction materials such as nylon or stainless steel as well as the removal of axles, aid in the reduction of sound produced, putting it well below the average produced by casters.

An aspect is directed to a caster that includes a main wheel with a spherical shape, a first support member with a first sphere that contacts against a first section of the main wheel, second support members that each include at least one second sphere that contact against a second section of the main wheel that is away from the first section, and a housing that extends around the main wheel and is connected to the first support member and the second support members. The main wheel, the first sphere, and the second spheres are each rotatable within the housing.

In one aspect, the first sphere contacts the main wheel along a vertical axis of the caster and each of the second spheres contacts the main wheel along lateral sides that are aligned in a plane that is perpendicular to the vertical axis.

In one aspect, the first support member includes secondary bearings that contact against the first sphere and are spaced away from the main wheel.

In one aspect, the first support member includes a cup with a semi-spherical inner surface with the plurality of second bearings positioned between and in contact with each of the inner surface and the main wheel.

In one aspect, a grip attaches to the housing and the first support member to position the first support member relative to the main wheel.

In one aspect, each of the second support members includes a pod attached to the housing with the pod including a closed side that is positioned away from the main wheel and an open side that is positioned towards the main wheel and with each of the pods sized to hold at least one of the second spheres and is sized for the second spheres to contact against the closed side and extend outward from the open side and contact against the main wheel.

In one aspect, the housing includes an opening along a bottom side and the main wheel extends outward from the housing through the opening.

In one aspect, a diameter of the main wheel is larger than the first sphere and the second spheres.

An aspect is directed to a caster that includes a housing, a main wheel with a spherical shape that is positioned in the housing with a bottom of the main wheel extending outward from the housing. The caster includes a first support member attached to the housing and including a cup, a first sphere that extends outward from the cup, and spherical bearings positioned between and in contact with each of the cup and the first sphere with the first sphere contacting the main wheel at a top of the main wheel. The caster also includes second support members attached to the housing and spaced away from the first support member with each of the second support members including at least one second sphere that contacts the main wheel along a lateral side of the main wheel between the top and the bottom. Each of the main wheel, the first sphere, and second spheres are rotatable within the housing.

In one aspect, the first sphere contacts the main wheel along a vertical axis that extends through a center of the main wheel and each of the second spheres contact the main wheel along a plane that extends through the center of the main wheel.

In one aspect, the housing includes an interior space with a majority of the main wheel positioned in the interior space and the first support member positioned completely in the interior space.

In one aspect, a diameter of the main wheel is larger than diameters of the first sphere and the second spheres.

In one aspect, a grip extends around a section of the housing and positions the first support member in the interior space.

In one aspect, an additional support member supports the main wheel with the additional support member including a support cup, a support sphere that extends outward from the cup, and spherical bearings positioned between and in contact with each of the support cup and the main wheel and with the additional support contacting the main wheel at the top of the main wheel.

In one aspect, each of the second support members includes a pod attached to the housing with the pod including a closed side that is positioned away from the main wheel and an open side that is positioned towards the main wheel and with each of the pods sized to hold at least one of the second spheres and sized for the at least one second spheres to contact against the closed side and extend outward from the open side to contact against the main wheel.

In one aspect, the housing includes an opening along a bottom edge and the main wheel extends outward through the opening.

An aspect is directed to a method of supporting an object on a support surface with a caster. The method includes: positioning a main spherical wheel that is attached to the object against the support surface; contacting a first section of the main spherical wheel with a first support sphere with the first support sphere being supported by spherical bearings; contacting a second section of the main spherical wheel with second support spheres with the second support spheres spaced away from the first support sphere; rotating the main spherical wheel and moving the object across the support surface; while rotating the main spherical wheel, rotating each of the first support sphere and the second support spheres due to the contact with the main spherical wheel; and while rotating the first support sphere, rotating the plurality of spherical bearings.

In one aspect, the method also includes rotating the main spherical wheel in a first direction and rotating each of the first support sphere and the second support spheres in an opposing second direction.

In one aspect, the method also includes rotating the plurality of spherical bearings contacting against the first support sphere in the first direction while rotating the first support sphere in the opposing second direction.

In one aspect, the method also includes contacting the first support sphere along a vertical axis of the main spherical wheel and contacting the second support spheres along a plane with each of the vertical axis and the plane extending through a center of the main spherical wheel.

The various aspects of the various embodiments may be used alone or in any combination, as is desired.

BRIEF DESCRIPTION OF THE DRAWINGS

FIG. 1 is a perspective view of a caster.
FIG. 2 is a side view of a caster.
FIG. 3 is an exploded side view of a caster.
FIG. 4A is a first perspective view of an upper housing.
FIG. 4B is a second perspective view of the upper housing of FIG. 4A.
FIG. 5A is a first perspective view of a bottom side of a lower housing.
FIG. 5B is a second perspective view of an inner side of the lower housing of FIG. 5A.
FIG. 6 is an exploded section view of a housing cut along line E-E of FIGS. 4B and 5B.
FIG. 7 is a side view of a main wheel.
FIG. 8 is a perspective view of a first support member.
FIG. 9 is a perspective view of a portion of a first support member with a cup removed.
FIG. 10 is a section side view of a first support member cut along line F-F of FIG. 8.

FIG. 11 is a perspective view of a grip.
FIG. 12 is a side section view of a grip cut along line G-G of FIG. 11.
FIG. 13 is a perspective view of a second support member.
FIG. 14 is a side section view of a caster cut along line B-B of FIG. 2.
FIG. 15 is a schematic side view of a caster.
FIG. 16 is a schematic perspective view of a caster.
FIG. 17 is a schematic side view of a caster.
FIG. 18 is a schematic perspective view of a caster.
FIG. 19 is an exploded section view of a first support member having pockets along an inner side and along a flange.

DETAILED DESCRIPTION

The present application is directed to a caster for use with an object. The caster provides for the object to be movable about a support surface, such as the floor on which the object is positioned. The caster includes a main wheel and multiple support members. One or more support members contact against and support the main wheel along a vertical axis. One or more support members also contact against and support the main wheel along lateral sides of the main offset from the vertical axis. These support members can contact the main wheel along a plane that is perpendicular to the vertical axis.

FIGS. 1 and 2 illustrate a caster 10 configured to be attached to an object to provide rolling movement of the object. The caster 10 includes a housing 20 and a main wheel 30. A grip 80 is attached to the housing 20 to secure a first support member that contacts the main wheel along a vertical axis VA. Additional support members are positioned in the housing 20 to contact and support the main wheel 30 along its lateral sides. A mount 60 extends outward from the housing 20 and grip 80 to connect the caster 10 to the object. The mount 60 can be aligned along the vertical axis VA.

FIG. 3 illustrates an exploded view of the caster 10. The housing 20 extends around a portion of the main wheel 30. The housing 20 can be a single unitary piece, or multiple pieces that are connected together including an upper housing 21 and a lower housing 22. A first support member 40 is supported by the housing 20 and contact the main wheel 30 at the vertical axis VA. Second contact members 50 are also supported by the housing 20 and contact the main wheel 30 along its lateral sides. The second contact members 50 can contact the main wheel 30 along a common plane A (see FIG. 2), or can be positioned in more than one plane. A grip 80 is connected to the housing 20 and secures the first support member 40. The mount 60 extends outward from a top of the housing 20 and grip 80 to attach to an object.

The housing 20 provides a frame for positioning and supporting the main wheel 30 and support members 40, 50. The housing 20 can be constructed from one or more pieces. FIGS. 4A, 4B, 5A and 5B illustrate a two-piece housing 20 that includes an upper housing 21 (FIGS. 4A, 4B) configured to be connected to a lower housing 22 (FIGS. 5A, 5B). The different sections can be connected together using a variety of different technique, including but not limited to one or more adhesives, mechanical fasteners, snap fits, and soldering.

As illustrated in FIGS. 4A and 4B, the upper housing 21 includes a collar 23. Arms 24 extend downward from the collar 23 and are spaced apart. Windows 26 are formed between the arms 24 and provide access to an interior space 28 formed within the upper housing 21. Receptacles 25 are positioned at the ends of the arms 24 opposite from the collar 23. The receptacles 25 are configured to contain the second support members 50. The arms 24 can each include the same length to position the second support members 50 along a common plane. The second support members 50 can also include different shapes and/or sizes positioning the second support members 50 at different locations along the lateral sides of the main wheel 30.

As illustrated in FIGS. 5A and 5B, the lower section 22 of the housing 20 includes a bottom side 91 through which a portion of the main wheel 30 extends to contact the support floor. The lower housing 22 also includes an opening 90 along the bottom side 91 through which the portion of the main wheel 30 extends. A center of the opening 90 can be aligned along an axis that extends through a center of the collar 23 of the upper housing 21.

The receptacles 25 are positioned at different radial locations around the periphery of the housing 20. The receptacles 25 can each be positioned a common distance away from a center of the interior space 28. Each receptacle 25 is shaped and sized to support one of the second support members 50. As illustrated in FIGS. 4A and 5B, each of the receptacles 25 include a main section 26 with a pair of cutouts 27 along an inner side that face inward towards the interior space 28 and opening 90 respectively.

FIG. 6 illustrates a sectional, exploded view of the housing 20 that includes the upper housing 21 and the lower housing 22. The upper portion of the interior space 28 of the upper housing 21 includes a dome-shaped holding section 29 shaped to receive and position the first support member 40. The holding section 29 includes a semi-spherical shape with an open side that faces downward into the interior space 28.

The main wheel 30 extends from the housing 20 and contacts against the support floor. As illustrated in FIG. 7, the main wheel 30 has a spherical shape with a diameter D. The spherical shape provides for omni-directional movement across the support floor. The main wheel 30 can be solid, or can be hollow.

The first support member 40 is positioned in the housing 20 and contacts the main wheel 30. FIGS. 8, 9, and 10 illustrate the first support member 40 that includes a contact bearing 41 and secondary bearings 42. The first support member 40 includes a cup 43 with a semi-spherical inner side that contacts against bearings 42. A flange 44 attaches to an open side of the cup 43. The flange 44 includes a central opening with a smaller inner diameter than the cup 43 to secure and prevent inadvertent escape of the bearings 41, 42.

Each of the bearings 41, 42 include a spherical shape and can be solid or hollow. Each of the secondary bearings 42 includes a common size with a common diameter. The contact bearing 41 can include a larger diameter than the secondary bearings 42. Other designs can include various relative sizes between the bearings 41, 42, including the bearings 42 being equal to or larger than the bearing 41.

As best illustrated in FIG. 10, the secondary bearings 42 are positioned at the inner side of the cup 43. When contacting against the contact bearing 41, the secondary bearings 42 can contact against the inner side of the cup 43. The contact bearing 41 is positioned against the secondary bearings 42 opposite from the cup 43. The contact bearing 41 is sized for a portion to extend outward beyond the flange 44 to contact against the main wheel 30.

The secondary bearings 42 maintain the position of the contact bearing 41 and maintain the contact bearing 41 in contact with the main wheel 30. The number of secondary bearings 42 can vary. One specific design includes fifteen (15) secondary bearings 42 to the single contact bearing 41. Other designs include more or fewer bearings 42 to the single contact bearing 41.

As illustrated in FIG. 10, the inner side of the cup 43 can be smooth. The inner side of the cup 43 can also include pockets 45 as illustrated in FIG. 19. The pockets 45 are each sized to hold one of the secondary bearings 42 and for the secondary bearings 42 to extend outward to contact against the contact bearing 41. In one design, a separate pocket 45 is positioned for each of the secondary bearings 42. The flange 44 can also include one or more pockets 45 to position the secondary bearings 42. The pockets 45 can extend around the contact bearing 41 for the secondary bearings 42 to provide contact on the lateral sides.

The grip 80 connects the first support member 40 to the housing 20 and positions the first support member 40 within the interior space 28 of the housing 20. As illustrated in FIGS. 11 and 12, the grip 80 includes a base 81 with an opening 82 sized to receive the mount 60. Arms 83 extend outward from the base 81 and terminate at fingers 84 that are directed inward towards the interior space 28 when the grip 80 is mounted to the housing 20. The arms 83 are spaced apart around the base 81 to be positioned in the windows 26 of the housing 21. When the grip 80 is mounted to the housing 20, the fingers 84 extend radially inward towards the interior space 28. The fingers 84 contact against the flange 44 of the first support member 40. This maintains the first support member 40 positioned within the holding section 29 of the housing 20.

FIG. 13 illustrates a second support member 50 that is positioned in a receptacle 25 in the housing 20. The second support members 50 contact against the lateral side of the main wheel 30. As illustrated in FIG. 13, the second support member 50 includes a pod 51 and one or more bearings 52. The pod 51 includes an elongated shape with an enclosed side and an open side. An inner surface of the enclosed side includes a curved surface that matches the shape of the bearings 52. The bearings 52 include a spherical shape and are sized to extend outward from the open side of the pod 51 to contact against the main wheel 30 when the second support member 50 is mounted to the housing 20. The bearings 52 can be solid or hollow, and are sized relative to the pod 51 to be rotatable within the pod 51. The bearings 52 can rotate along the lateral sides of the main wheel 30. In use, the bearings 52 rotate in the opposite direction to that of the main wheel 30.

The pods 51 are sized to fit within the receptacles 25 of the housing 20. This positions the exposed portions of the bearings 52 outward through the cutouts 27. The cutouts 27 of the housing 20 can maintain the bearings 52 within the pod 51 and prevent their escape.

The pods 51 are positioned in the housing 20 such that each bearing 52 extends outward to contact against the main wheel 30. The pods 51 can be configured with each bearing 52 positioned to contact the main wheel 30 along the support plane A (see FIG. 2). In one design, the support plane A bisects the main wheel 30 between a top and bottom of the main wheel 30. The pods 51 can also be positioned to contact the main wheel 30 within different planes along the lateral sides of the main wheel 30.

The pods 51 can include different shapes and sizes. The pods 51 can be configured to contain a single bearing 52, or two or more bearings 52.

The secondary contact members 50 are positioned around the perimeter of the main wheel 30. At least two secondary contact members 50 are positioned around the main wheel 30 and can be evenly spaced around the perimeter. By way of example, a pair of secondary contact members 50 can be spaced apart by about 180° (i.e., on opposing sides of the main wheel 30). In one design with three secondary contact members 50, the members 50 are separated by about 120°. Four secondary contact members 50 can be spaced apart by about 90°.

In one design, at least two bearings 52 of the secondary contact members 50 are in contact with the main wheel 30. This can include two bearings 52 from a single pod 51, or bearings 52 from different pods 51. Other designs include more than two bearings 52 simultaneously contacting against the main wheel 30. In one design, each of the bearings 52 simultaneously contacts against the main wheel 30.

FIG. 14 illustrates first and second support members 40, 50 contacting against and supporting the main wheel 30. The first support member 40 is positioned at an upper portion of the interior space 28 above the main wheel 30. The contact bearing 41 is positioned along and contacts against the main wheel 30 at the vertical axis VA. The secondary bearings 42 are positioned between the contact bearing 41 and the cup 43 to maintain the contact bearing 41 against the main wheel 30.

The second support members 50 are positioned around the lateral sides of the main wheel 30. The bearings 52 extend outward from the pods 51 and contact against the main wheel 30. In one design, the bearings 52 are aligned along and contact against the main wheel within a common support plane A. In one design, the support plane A is located along a midpoint of the diameter D of the main wheel 30 an equal distance between the top and bottom of the main wheel 30.

As illustrated in FIG. 15, the caster 10 forms a pyramid-shaped support structure. The three-sided pyramid has a vertex that sits on the vertical axis VA. An outer edge P of the pyramid is aligned with a center point of the bearings 52. Further, the bearings 52 are aligned on and contact the main wheel 30 along the support plane A. Further, the support plane A extends through a center C of the main wheel 30. The contact bearing 41 is positioned within the outer edge P of the pyramid. The contact bearing 41 is centered along and contacts the main wheel 30 along the vertical axis VA.

As illustrated in FIG. 16, the caster 10 can include a circumferential axis X. The circumferential axis X can be positioned in the support plane A. The support plane A is perpendicular to the vertical axis VA and passes through a center of the main wheel 30 and the bearings 52.

In use, the caster 10 provides for rolling movement of an object along a support floor. The main wheel 30 remains in contact with and rotates along the support floor. The contact bearing 41 contacts against and supports the main wheel 30. The contact bearing 41 rotates in an opposite direction than the main wheel 30. The secondary bearings 42 contact against the contact bearing 41 and rotate in the same direction as the main wheel 30.

The support members 50 contact against and support the main wheel 30. At least two bearings 52 maintain contact against the main wheel 30, and each of the bearings 52 can contact against the main wheel 30. The bearings 52 rotate in a direction opposite of the main wheel 30.

The caster 10 provides for omni-directional movement. Further, the contact between the main wheel 30 and the support members 40, 50 provide for smooth rotational movement of the main wheel. This contact also reduces the amount of sound that is made by the caster 10 during rotational movement.

The caster 10 can include a single support member 40 as disclosed above. The caster 10 can also include multiple support members 40 as illustrated in FIGS. 17 and 18. The support members 40 can be configured as described above with a contact bearing 41 and secondary bearings 42. The support members 40 can further include a cup 43. The number of secondary bearings 42 can vary. As illustrated in FIGS. 17 and 18, the support members 40 are spaced away from the vertical axis VA. Each of the contact bearings 41 contacts the main wheel 30. In one design, each contacts the main wheel 30 along a common plane B. In one specific design, the plane B is parallel with plane A. The support of the main wheel 30 forms a pyramid-shaped support structure with a vertex that sits on the vertical axis VA and an outer edge P aligned with a center point of the bearings 52. Further, the bearings 52 are aligned on and contact the main wheel 30 along the support plane A. Further, the support plane A extends through a center C of the main wheel 30. As illustrated in FIG. 18, the caster 10 can include a circumferential axis X. The circumferential axis X can be positioned in the support plane A. The support plane A is perpendicular to the vertical axis VA and passes through a center of the main wheel 30 and the bearings 52.

In one design with multiple support members 40, external lateral support may not be necessary for the integrity of the caster 10.

The various components of the caster 10 can be constructed from a variety of different materials. Materials include but are not limited to polypropylene, TEFLON, nylon, phenolic resin, polyurethane, hard rubber, polycarbonate, chromium, metals including steel and stainless steel, and nylon.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive.

What is claimed is:
1. A caster comprising:
a main wheel with a spherical shape;
a first support member comprising a first sphere that contacts against a first section of the main wheel;
a plurality of second support members each comprising at least one second sphere that contacts against a second section of the main wheel that is away from the first section;
a housing that extends around the main wheel and is connected to the first support member and the plurality of second support members;

the main wheel, the first sphere, and the second spheres each being rotatable within the housing; and a grip that attaches to the housing and the first support member to position the first support member relative to the main wheel.

2. The caster of claim 1, wherein the first sphere contacts the main wheel along a vertical axis of the caster and each of the second spheres contacts the main wheel along lateral sides that are aligned in a plane that is perpendicular to the vertical axis.

3. The caster of claim 1, wherein the first support member further comprises a plurality of secondary bearings that contact against the first sphere and are spaced away from the main wheel.

4. The caster of claim 3, wherein the first support member further comprises a cup with a semi-spherical inner surface with the plurality of secondary bearings positioned between and in contact with each of the inner surface and the first sphere.

5. The caster of claim 1, wherein each of the second support members comprises a pod attached to the housing, the pod comprising a closed side that is positioned away from the main wheel and an open side that is positioned towards the main wheel, each of the pods sized to hold at least one of the second spheres and is sized for the second spheres to contact against the closed side and extend outward from the open side and contact against the main wheel.

6. The caster of claim 1, wherein the housing includes an opening along a bottom side and the main wheel extends outward from the housing through the opening.

7. The caster of claim 1, wherein a diameter of the main wheel is larger than the first sphere and the second spheres.

8. A caster comprising:

a housing;

a main wheel with a spherical shape and positioned in the housing with a bottom of the main wheel extending outward from the housing;

a first support member attached to the housing, the first support member comprising a cup, a first sphere that extends outward from the cup, and spherical bearings positioned between and in contact with each of the cup and the first sphere, the first sphere contacting the main wheel at a top of the main wheel;

second support members attached to the housing and spaced away from the first support member, each of the second support members comprising at least one second sphere that contacts the main wheel along a lateral side of the main wheel between the top and the bottom;

each of the main wheel, the first sphere, and second spheres being rotatable within the housing; and a grip that extends around a section of the housing and positions the first support member in the interior space.

9. The caster of claim 8, wherein the first sphere contacts the main wheel along a vertical axis that extends through a center of the main wheel and each of the second spheres contact the main wheel along a plane that extends through the center of the main wheel.

10. The caster of claim 8, wherein the housing comprises an interior space with a majority of the main wheel positioned in the interior space and the first support member positioned completely in the interior space.

11. The caster of claim 8, wherein a diameter of the main wheel is larger than diameters of the first sphere and the second spheres.

12. The caster of claim 8, wherein each of the second support members comprises a pod attached to the housing, the pod comprising a closed side that is positioned away from the main wheel and an open side that is positioned towards the main wheel, each of the pods sized to hold at least one of the second spheres and is sized for the at least one second sphere to contact against the closed side and extend outward from the open side to contact against the main wheel.

13. The caster of claim 8, wherein the housing includes an opening along a bottom edge and the main wheel extends outward through the opening.

* * * * *